United States Patent
Deng

(10) Patent No.: US 10,197,845 B2
(45) Date of Patent: Feb. 5, 2019

(54) MANUFACTURING METHOD OF COLOR FILTER SUBSTRATE AND MANUFACTURING METHOD OF LIQUID CRYSTAL PANEL

(71) Applicant: Shenzhen China Star Optoelectronics Technology Co., Ltd., Shenzhen, Guangdong (CN)

(72) Inventor: Zhuming Deng, Guangdong (CN)

(73) Assignee: Shenzhen China Star Optoelectronics Semiconductor Display Technology Co., Ltd, Shenzhen, Guangdong (CN)

( * ) Notice: Subject to any disclaimer, the term of this patent is extended or adjusted under 35 U.S.C. 154(b) by 45 days.

(21) Appl. No.: 15/543,993

(22) PCT Filed: Apr. 24, 2017

(86) PCT No.: PCT/CN2017/081694
§ 371 (c)(1),
(2) Date: Jul. 15, 2017

(87) PCT Pub. No.: WO2018/188114
PCT Pub. Date: Oct. 18, 2018

(65) Prior Publication Data
US 2018/0335665 A1    Nov. 22, 2018

(51) Int. Cl.
*G02F 1/1335*    (2006.01)
*G02F 1/1339*    (2006.01)
*G02F 1/1341*    (2006.01)

(52) U.S. Cl.
CPC ...... *G02F 1/133516* (2013.01); *G02F 1/1339* (2013.01); *G02F 1/1341* (2013.01); *G02F 1/13394* (2013.01); *G02F 2001/13396* (2013.01)

(58) Field of Classification Search
CPC ............ G02F 1/133516; G02F 1/1339; G02F 1/13394
See application file for complete search history.

(56) References Cited

FOREIGN PATENT DOCUMENTS

| CN | 203337948 U | 12/2013 |
|---|---|---|
| CN | 104749812 A | 7/2015 |
| CN | 105467660 A | 4/2016 |
| CN | 106483719 A | 3/2017 |
| JP | 2011081177 A | 4/2011 |
| JP | 2011197599 A | 10/2011 |

*Primary Examiner* — Joseph L Williams
(74) *Attorney, Agent, or Firm* — Andrew C. Cheng

(57) ABSTRACT

Disclosed is a manufacturing method of a color filter substrate, comprising: providing a first substrate, and the first substrate comprising pixel unit regions and a light blocking region located between the pixel unit regions, coating a photoresist material on the first substrate, and exposing the pixel unit regions to form monochromatic blocks, and partially exposing the light blocking region to form color blocks; coating a black photoresist material in the light blocking region, and the black photoresist material covering the color blocks; exposing the black photoresist material and the black photoresist material located in the light blocking region forming a black matrix and the black photoresist material covering the color blocks forming spacers. The black photoresist material, of which the color blocks are used to be the substrate, form spacers, and the black photoresist material in the rest part of the light blocking region forms a black matrix.

18 Claims, 6 Drawing Sheets

MANUFACTURING METHOD OF COLOR FILTER SUBSTRATE AND MANUFACTURING METHOD OF LIQUID CRYSTAL PANEL

CROSS REFERENCE

This application claims the priority of Chinese Patent Application No. 2017102299577, entitled "Manufacturing method of color filter substrate and manufacturing method of liquid crystal panel", filed on Apr. 10, 2017, the disclosure of which is incorporated herein by reference in its entirety.

FIELD OF THE INVENTION

The present application relates to a display technology field, and more particularly to a manufacturing method of a color filter substrate and a manufacturing method of a liquid crystal panel.

BACKGROUND OF THE INVENTION

The Thin Film Transistor-Liquid Crystal Display (TFT-LCD) comprises a Color Filter Substrate (CF Substrate) and a Thin Film Transistor Substrate (TFT Substrate), and there are transparent electrodes on the opposite inner sides of the substrates. A layer of Liquid Crystal (LC) is sandwiched between the two substrates. The liquid crystal display is changes the polarization state of light by controlling the liquid crystal molecular orientation with the electric field, and the purpose of display is achieved by penetration and blocking of the light path with the polarizer. The color filter substrate is a key component of the liquid crystal display colorization, and the color filter substrate needs coating and exposure for the black photo spacer (black matrix material), the photoresist materials of red, green, blue colors and the manufacture of the spacers.

In prior art, for simplifying the manufacture process, the Black Photo Spacer (BPS) is coated on a position of a scan line, and the Multi Tone Mask (MTM) technology is used for implementing exposure at multiple different light intensities to form the black matrix and the spacers, of which the heights are different, thereby to combine the black matrix process and spacer process into one process for simplifying the manufacture process. However, the MTM mask skill is complicated, and the manufacture difficulty is high. The mask is expensive and the manufacturing cost of the color filter substrate and the liquid crystal panel is high.

SUMMARY OF THE INVENTION

On this account, the technical issue to be solved by the present application is to provide a manufacturing method of a color filter substrate and a manufacturing method of a liquid crystal panel to solve the problem of the high production cost of the color film substrate and the liquid crystal panel in prior art.

A manufacturing method of a color filter substrate, comprising steps of:

providing a first substrate, and the first substrate comprising pixel unit regions and a light blocking region located between the pixel unit regions, coating a photoresist material on the first substrate, and exposing the pixel unit regions to form monochromatic blocks, and partially exposing the light blocking region to form color blocks;

coating a black photoresist material in the light blocking region, and the black photoresist material covering the color blocks;

exposing the black photoresist material and the black photoresist material located in the light blocking region forming a black matrix and the black photoresist material covering the color blocks forming spacers.

The color blocks formed by exposing the photoresist material process at one time comprise a first color block and a second color block, of which sizes are different.

A size of a front projection of the first color block on the light blocking region is larger than a size of a front projection of the second color block on the light blocking region, and the black photoresist material on a surface of the first color block is exposed to form a main spacer, and the black photoresist material on a surface of the second color block is exposed to form an auxiliary spacer.

The color blocks are located between adjacent two monochromatic blocks of the same color, and a color of the monochromatic block adjacent to the first color block is the same as a color of the monochromatic block adjacent to the second color block.

A color of the first color block is the same as a color of the second color block.

The color of the color blocks are the same as the color of the monochromatic blocks adjacent to the color blocks.

The monochromatic blocks comprises red color blocks, green color blocks and blue color blocks, and the monochromatic blocks are located in the light blocking region between two of the blue color blocks which are adjacent.

The color blocks are blue.

The color blocks include height dimensions perpendicular to the first substrate, and the height dimension of the first color block is equal to the height dimension of the second color block.

The present invention further provides a manufacturing method of a liquid crystal panel, comprising steps of:

providing a first substrate, and the first substrate comprising pixel unit regions and a light blocking region located between the pixel unit regions, coating a photoresist material on the first substrate, and exposing the pixel unit regions to form monochromatic blocks, and partially exposing the light blocking region to form color blocks;

coating a black photoresist material in the light blocking region, and the black photoresist material covering the color blocks;

exposing the black photoresist material and the black photoresist material located in the light blocking region forming a black matrix and the black photoresist material covering the color blocks forming spacers.

dropping liquid crystal on the color filter substrate;

and bonding a second substrate to the color filter substrate, and adhering an edge region of the second substrate with an edge region of the first substrate by using sealant.

The color blocks formed by exposing the photoresist material process at one time comprise a first color block and a second color block, of which sizes are different.

A size of a front projection of the first color block on the light blocking region is larger than a size of a front projection of the second color block on the light blocking region, and the black photoresist material on a surface of the first color block is exposed to form a main spacer, and the black photoresist material on a surface of the second color block is exposed to form an auxiliary spacer.

The color blocks are located between adjacent two monochromatic blocks of the same color, and a color of the monochromatic block adjacent to the first color block is the same as a color of the monochromatic block adjacent to the second color block.

A color of the first color block is the same as a color of the second color block.

The color of the color blocks are the same as the color of the monochromatic blocks adjacent to the color blocks.

The monochromatic blocks comprises red color blocks, green color blocks and blue color blocks, and the monochromatic blocks are located in the light blocking region between two of the blue color blocks which are adjacent.

The color blocks are blue.

The color blocks include height dimensions perpendicular to the first substrate, and the height dimension of the first color block is equal to the height dimension of the second color block.

The benefits of the present application is: the color blocks are formed with exposing the light blocking region while manufacturing the monochromatic blocks without an additional process, and the black photoresist material is coated in the light blocking region and one time exposure is implemented, the black photoresist material, of which the color blocks are used to be the substrate, form spacers after exposure, and the black photoresist material in the rest part of the light blocking region forms a black matrix after exposure, and the exposure process can be realized with the ordinary mask, and the material cost of the ordinary mask is low and the photo process of the black photoresist material is simple, and the manufacturing cost of the color filter substrate is low.

BRIEF DESCRIPTION OF THE DRAWINGS

In order to more clearly explain the technical solution in the embodiments of the present invention, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained, should all be considered within the scope of protection of the present application.

Figure 1:
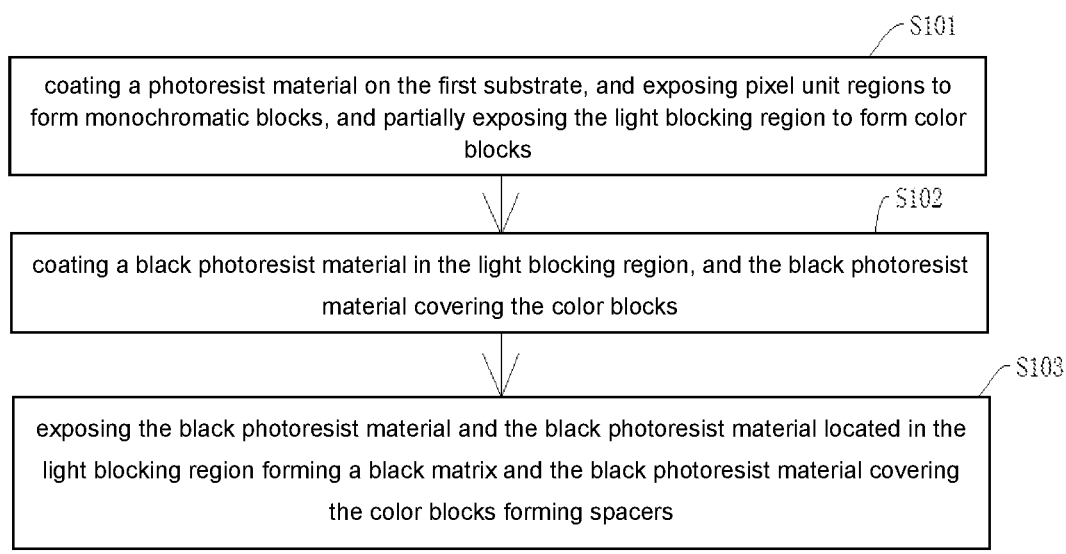
FIG. 1 is a flowchart of a manufacturing method of a color filter substrate provided by the embodiment of the present application.

FIG. 1 is a flowchart of a manufacturing method of a color filter substrate provided by the embodiment of the present application. As shown in figure, the manufacturing method is described below:

S101, coating a photoresist material on the first substrate 100, and exposing pixel unit regions 102 to form monochromatic blocks, and partially exposing the light blocking region 104 to form color blocks.

Figure 2:
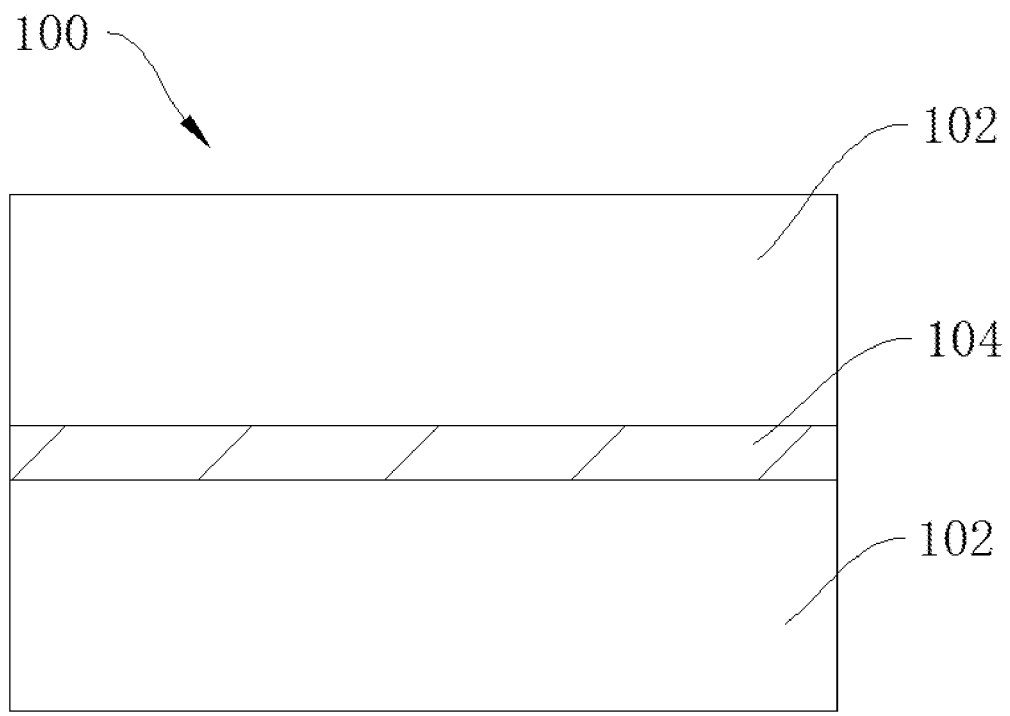
FIG. 2 is a surface diagram of a first substrate provided by the embodiment of the present application.

The first substrate 100 is a glass substrate, as a substrate of a color filter substrate for carrying the monochromatic blocks and spacers. Combining FIG. 2 and FIG. 9, the first substrate 100 comprise pixel unit regions 102 and a light blocking region 104, and the light blocking region 104 is located between the pixel unit regions 102, and the pixel unit regions 102 are used to form the monochromatic blocks to realize the color display of a liquid crystal display, and the light blocking region 104 corresponds to the elements of a scan line of an array substrate, which is opaque and not penetrated by the backlight, and the light blocking region 104 is used to form a black matrix 500 and blocks the elements, such as the scan line. In one preferred embodiment, the light blocking region 104 is a strip shape corresponding to the scanning line.

Figure 3:
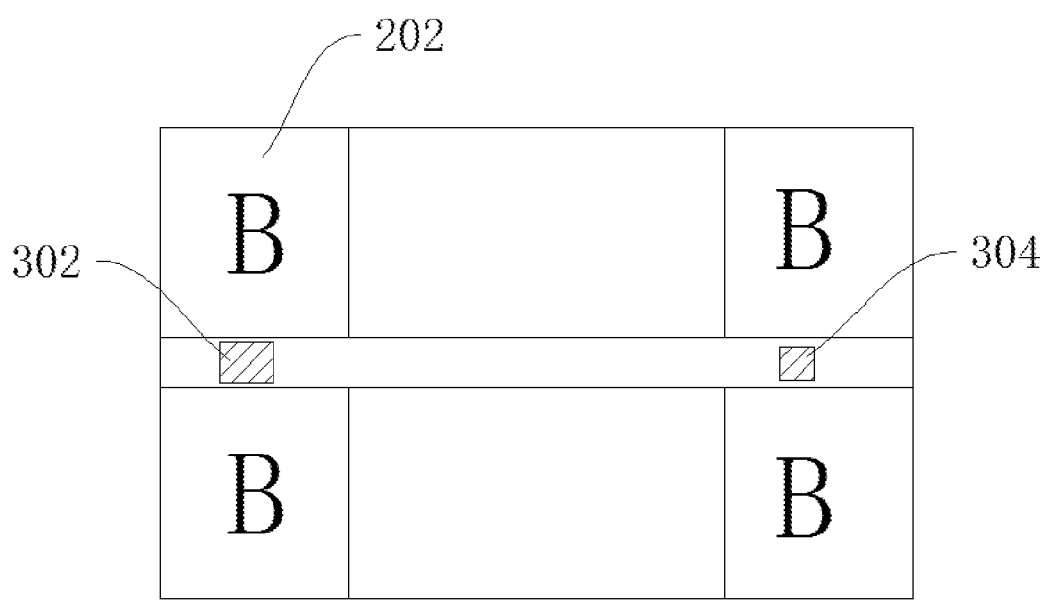
FIG. 3 and FIG. 4 are diagram of step S101 in a manufacturing method of a color filter substrate provided by the embodiment of the present application.
Figure 4:
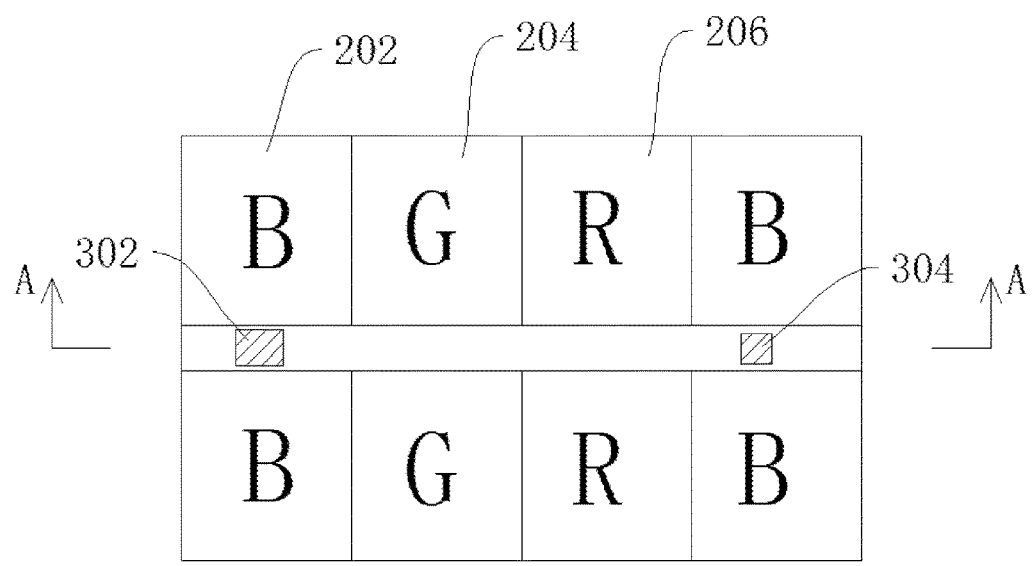

Combining FIG. 3 and FIG. 4, after the pixel unit regions 102 and the light blocking region 104 of the first substrate 100 are uniformly coated with photoresist materials of various colors and with the exposure and development with the mask in order, the monochromatic blocks of various colors are alternately arranged on the pixel unit regions 102. Specifically, the photoresist material comprises a blue photoresist material, a green photoresist material and a red photoresist material. The correspondingly formed monochromatic blocks comprise blue color blocks 202, green color blocks 204 and red color blocks 206. In one preferred embodiment, the photoresist material further comprises a white photoresist material, correspondingly forming white color blocks after exposure. While the monochromatic blocks are formed in the pixel cell regions 102, the color blocks are formed in the light blocking region 104 at the same time. Furthermore, the one time exposure for the photoresist material forms the monochromatic blocks and the color blocks at the same time. The formed color blocks comprise a first color block 302 and a second color block 304, of which sizes are different. Specifically, a size of a front projection of the first color block 302 on the light blocking region 104 is larger than a size of a front projection of the second color block 304 on the light blocking region 104. Or it can be understood that an area of the front projection of the first color block 302 on the light blocking region 104 is larger than an area of the front projection of the second color block 304 on the light blocking region 104. The first color block 302 is used for forming a main spacer 502 after exposing the black photoresist material 40 on the surface thereof, and the second color block 304 is used for forming an auxiliary spacer 504 after exposing the black photoresist material 40 on the surface thereof. The first color blocks 302 and the second color blocks 304 are alternately arranged for uniformly distributing the main spacers 502 and the auxiliary spacers 504 to improve the support effect of the spacers.

In this embodiment, a blue color block 202, a green color block 204 and a red color block 206 form one pixel unit. The two pixel units on both sides of the light blocking region 104 are symmetrical in color, i.e. the opposite two monochromatic blocks on both sides of the light blocking region 104 have the same color. Furthermore, the corresponding monochromatic blocks on both sides of the adjacent color block have the same color. Namely, the corresponding monochromatic blocks on both sides of the first color block 302 have the same color, and the corresponding monochromatic blocks on both sides of the second color block 304 have the same color. For instance, all the corresponding monochromatic blocks on both sides of the first color block 302 and the second color block 304 in FIG. 4 are blue color blocks 202 so that the pitches among the first color blocks 302 and the second color block 304s are constant. Namely, the pitches among the main spacers 502 and the and the auxiliary spacers 504, which are formed on the color blocks in the following, are constant for uniformly distributing the spacers to improve the support effect of the spacers. In one preferred embodiment, the color of the color block is the same as the color of the monochromatic blocks on both sides of the color block. For instance, the first color block 302 in FIG. 4 is blue, and the monochromatic blocks on both sides of the first color block 302 are blue, too. The second color block 304 is blue, and the monochromatic blocks on both sides of the second color block 304 are blue, too. Accordingly, it is convenient for exposing to form the color blocks while forming the monochromatic blocks to simplify the manufacturing process. In other embodiment, the color of the color blocks and the color of the monochromatic blocks can be different, too. In this embodiment, a color of the first color block 302 is the same as a color of the second color block 304 for forming the first color block 302 and the second color block 304 at the same time to simplify the formation step of the color blocks.

In one embodiment, the specific process of forming the monochromatic blocks and the color blocks is described below:

1. coating a blue photoresist material and exposing the same to form blue color blocks 202 in the pixel unit region 102, and forming color blocks which are blue in the light blocking region 104 correspondingly between the two blue color blocks 202, and the color blocks comprises a first color block 302 and a second color block 304. Only one first color block 302 or one second color block 304 is located between each pair of pixel units, and both the first color block 302 and the second color block 304 are blue.

2. coating a green photoresist material and exposing the same to form green color blocks 204 in the pixel unit region 102.

3. coating a red photoresist material and exposing the same to form red color blocks 206 in the pixel unit region 102.

Figure 5:
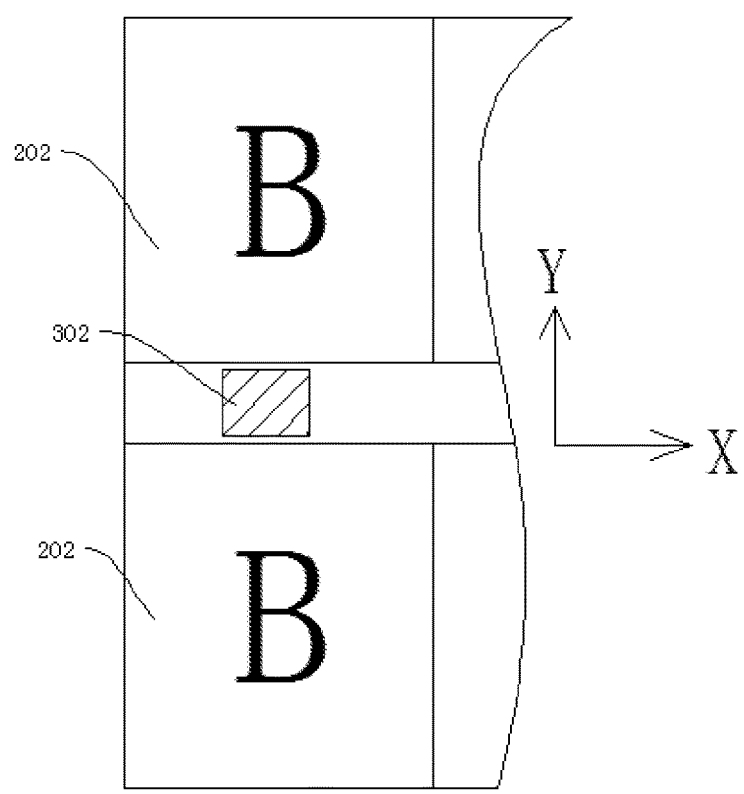
FIG. 5 is a partially enlarged diagram of the color filter substrate in step S101.
Figure 6:
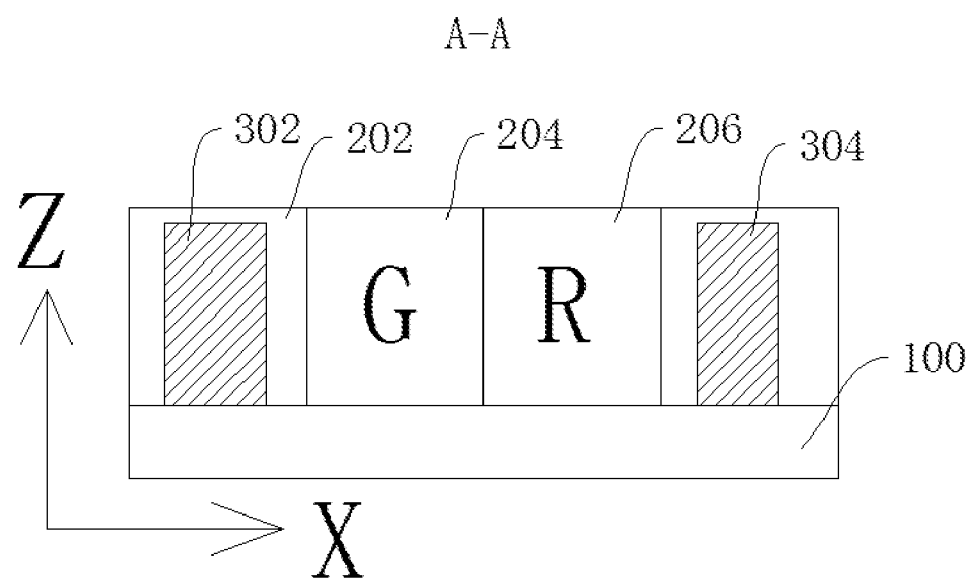
FIG. 6 is a sectional view diagram of the color filter substrate in step S101.

Combining FIG. 5 and FIG. 6, FIG. 6 is a sectional view diagram of the color filter substrate in the A-A direction. In one preferred embodiment, the front projection of the color block in the light blocking region 104 is a rectangular shape. In other embodiment, the front projection of the color block in the light blocking region 104 can also be a circle and other shapes. Furthermore, the color block includes the dimension of the first direction X, the dimension of the second direction Y and the dimension of the third direction Z. The dimension of the first direction X and the dimension of the second direction Y are the plan dimensions of the front projection of the color block in the light blocking region 104. The dimension of the third direction Z is the dimension in the direction perpendicular to the first substrate 100, i.e. the height dimension of the color block. By changing the dimension of the first direction X or the dimension of the second direction Y, the area of the front projection of the color block in the light blocking region 104 can be changed.

S102, coating a black photoresist material 40 in the light blocking region 104, and the black photoresist material 40 covering the color blocks.

Figure 7:
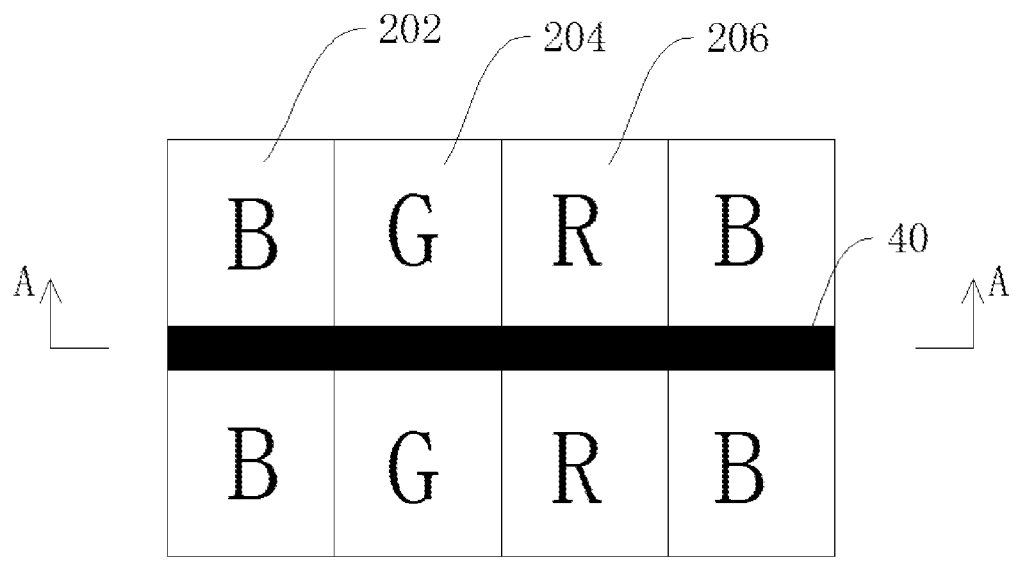
FIG. 7 and FIG. 8 are diagrams of step S102 in a manufacturing method of a color filter substrate provided by the embodiment of the present application.
Figure 8:
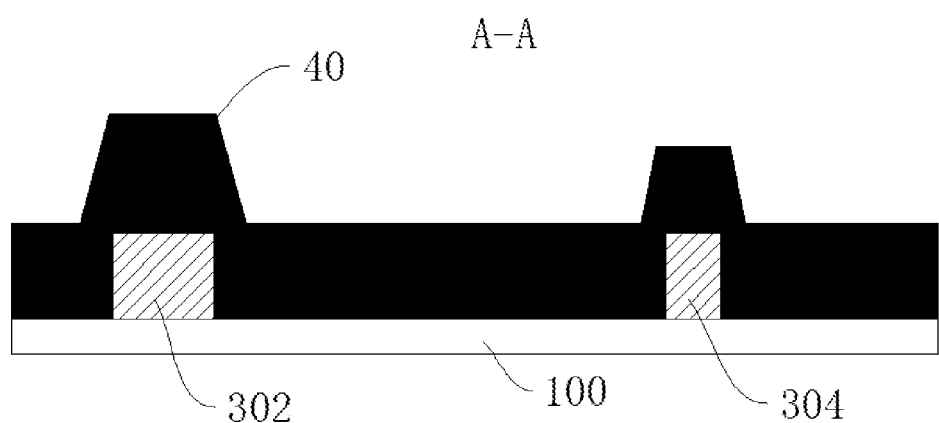

Combining FIG. 7 and FIG. 8, FIG. 8 is a sectional view diagram of the color filter substrate in the A-A direction. The black photoresist material 40 which is uniformly coated in the light blocking region 104 covers the surface of the first substrate 100, the surface of the first color block 302 and the surface of the second color block 304. Because the color blocks are on the first substrate 100, the black photoresist material 40 coated on the surface of the color blocks is stacked on the on the surface of the color blocks. The black photoresist material 40 coated on the surface of the first substrate 100 is stacked on the on the surface of the first substrate 100. Namely, the black photoresist material 40 on the surface of the color blocks is higher than the black photoresist material 40 on the surface of the first substrate 100.

S103, exposing the black photoresist material 40 and the black photoresist material 40 located in the light blocking region 104 forming a black matrix 500 and the black photoresist material 40 covering the color blocks forming spacers.

Because the dimensions of the front projection of the first color block 302 and the dimensions of the front projection of the second color block 304 in the light blocking region 104 are different. Namely, the dimensions of the first color block 302 and the second color block 304 are different in the XY plane formed by the first direction X and the second direction Y. The leveling effects of the black photoresist material 40 on the surface of the first color block 302 and the second color block 304 are different. Thus, the black photoresist material 40 forms the main spacer 502 and the auxiliary spacer 504, of which the heights (the third direction Z) are different after exposure. Specifically, the black photoresist material 40 is a liquid having a certain viscosity and fluidity before exposure and development. The black photoresist material 40 flows to the periphery after being applied to the surface of first color block 302 or the second color block 304 for leveling. The leveling effect is related to the surface tension of the liquid. Specifically, The greater the surface tension is, the better the leveling effect becomes. The value of the surface tension is inversely proportional to the dimension of the color block in the XY plane. Namely, the smaller the dimension of the color block in the XY plane is, the greater the surface tension of the black photoresist material 40 on the color block becomes and the better the leveling effect of the black photoresist material 40 becomes. Because the dimension of the first color block 302 in the XY plane is larger than the dimension of the second color block 304 in the XY plane, the leveling effect of the black photoresist material 40 on the surface of the second color block 304 is relatively better. The height of the spacer formed on the surface of the second color block 304 is smaller than the height of the spacer formed on the surface of the first color block 302. Namely, the main spacer 502 is formed on the surface of the first color block 302 and the auxiliary spacer 504 is formed on the surface of the second color block 304.

Figure 9:
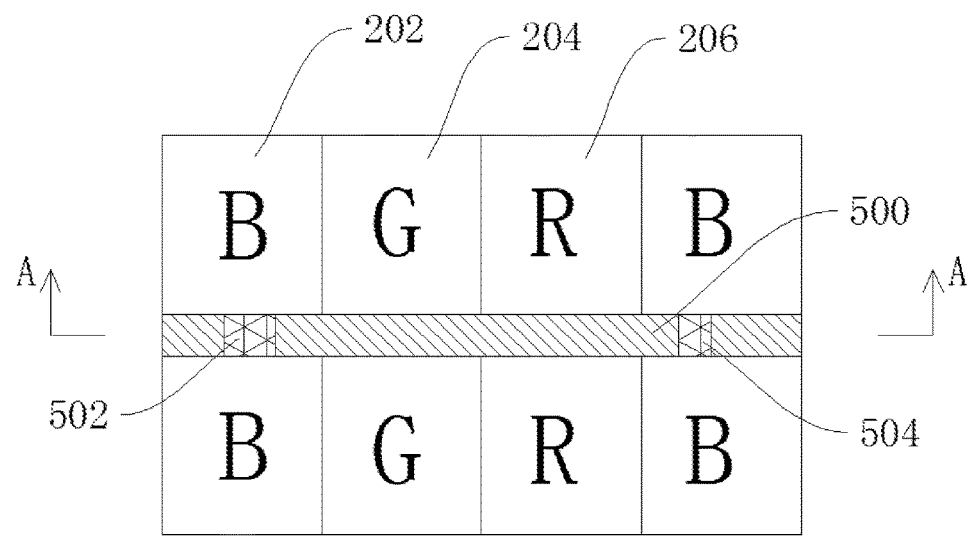
FIG. 9 is a diagram of a color filter substrate manufactured by a manufacturing method of a color filter substrate provided by the embodiment of the present application.
Figure 10:
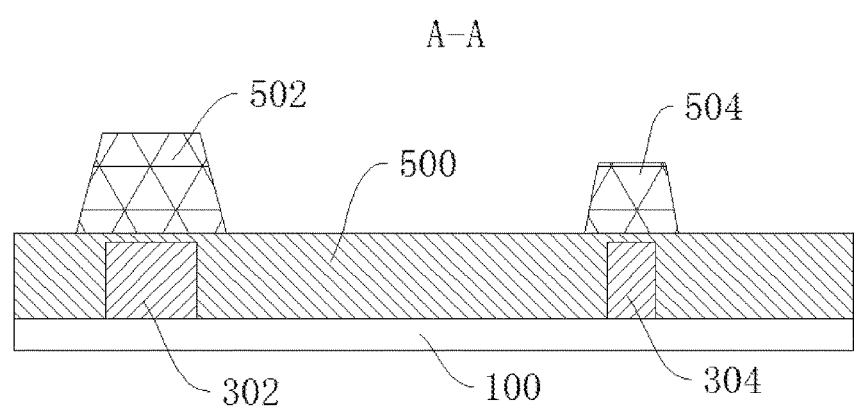
FIG. 10 is a sectional view diagram of a color filter substrate manufactured by a manufacturing method of a color filter substrate provided by the embodiment of the present application.

Combining FIG. 9 and FIG. 10, FIG. 10 is a sectional view diagram of the color filter substrate in the A-A direction. The black photoresist material 40 directly coated on the surface of the first substrate 100 forms a black matrix 500 after exposure. The black photoresist material 40 coated on the surface of the first color block 302 forms a main spacer 502 after exposure. The black photoresist material 40 coated on the surface of the second color block 304 forms an auxiliary spacer 504 after exposure. The effect of the dimension of the first direction X to the height of the spacer is greater than the dimension of the second direction Y. By selecting the color blocks, which are different in the dimension of the first direction X and the dimension of the second direction Y, the height of the spacers is in a range of 3.87 to 4.51 μm with adjusting the heights of the spacers according to the leveling property of the black photoresist material 40. The maximum height difference between the main spacer 502 and the auxiliary spacer 504 is 0.64 μm, and the requirements for the spacer as manufacturing the liquid crystal panel can be satisfied.

The color blocks are formed with exposing the light blocking region 104 while manufacturing the monochromatic blocks without an additional process, and the black photoresist material 40 is coated in the light blocking region 104 and one time exposure is implemented, the black photoresist material 40, of which the color blocks are used to be the substrate, form spacers after exposure, and the black photoresist material 40 in the rest part of the light blocking region 104 forms a black matrix 500 after exposure, and the exposure process can be realized with the ordinary mask, and the material cost of the ordinary mask is low and the photo process of the black photoresist material 40 is simple, and the manufacturing cost of the color filter substrate is low. Furthermore, the black matrix 500 is formed on the surface of the first substrate 100, and the main spacer 502 is formed on the surface of the first color block 302, and the auxiliary spacer 504 is formed on the surface of the second color block 304. One time exposure can achieve the formation of the black matrix 500, the main spacer 502 and the auxiliary spacer 504 having different heights to simplify the manufacturing process and to reduce the manufacturing cost.

In this embodiment, the monochromatic blocks comprises red color blocks 206, green color blocks 204 and blue color blocks 202, and the clock blocks are located in the light blocking region 104 between the adjacent two blue color blocks 202. Because the blue color blocks 202 are the color blocks with the smallest height in the manufacturing process of the color blocks, the arrangement of the spacers next to the blue color blocks 202 facilitates the avoidance of interference of the color blocks to the liquid crystal molecules. Furthermore, the color blocks are also blue, and the color blocks which are blue and blue color blocks 202 are manufactured at the same time, which is beneficial to decrease the manufacturing processes and to reduce the manufacturing cost.

In this embodiment, the height dimension (the dimension of the third direction Z) of the first color block 302 is equal to the height dimension of the second color block 304. By changing the dimension of the first direction X and the dimension of the second direction Y (the dimension in the XY plane) of the first color block 302 and the second color block 304, the main spacer 502 and the auxiliary spacer 504 with different heights can be obtained with the different leveling effects of the black photoresist material 40. It is not necessary to change the dimensions of the third direction Z of the first color block 302 and the second color block 304. Because of forming the first color block 302 and the second color block 304 of which the dimensions of the third direction Z are the same, the same coated photoresist material is used only for one time exposure and the dimensions of the third direction Z of the first color block 302 and the second color block 304 are the same. As long as the dimension in the XY plane is controlled, the heights of the main spacer 502 and the auxiliary spacer 504 can be correspondingly controlled. The manufacturing process is simple to reduce the manufacturing cost.

The color blocks are formed with exposing the light blocking region 104 while manufacturing the monochromatic blocks without an additional process, and the black photoresist material 40 is coated in the light blocking region 104 and one time exposure is implemented, the black photoresist material 40, of which the color blocks are used to be the substrate, form spacers after exposure, and the black photoresist material 40 in the rest part of the light blocking region 104 forms a black matrix 500 after exposure, and the exposure process can be realized with the ordinary mask, and the material cost of the ordinary mask is low and the photo process of the black photoresist material 40 is simple, and the manufacturing cost of the color filter substrate is low.

The embodiment of the present invention further provides a manufacturing method of a liquid crystal panel, comprising:

step 1, manufacturing a color filter substrate. The specific manufacturing method of the color filter substrate is as described above.

step 2, dropping liquid crystal on the color filter substrate.

step 3, bonding a second substrate to the color filter substrate, and adhering an edge region of the second substrate with an edge region of the first substrate 100 by using sealant.

The color blocks are formed with exposing the light blocking region 104 while manufacturing the monochromatic blocks without an additional process, and the black photoresist material 40 is coated in the light blocking region 104 and one time exposure is implemented, the black photoresist material 40, of which the color blocks are used to be the substrate, form spacers after exposure, and the black photoresist material 40 in the rest part of the light blocking region 104 forms a black matrix 500 after exposure, and the exposure process can be realized with the ordinary mask, and the material cost of the ordinary mask is low and the photo process of the black photoresist material 40 is simple, and the manufacturing cost of the liquid crystal panel is low.

The foregoing descriptions are merely the specific embodiments of the present application. However, the present application is not limited thereby. Any modifications, equivalent replacements or improvements within the spirit and principles of the embodiment described above, which can be easily derived by those skilled persons in this art from the technical field disclosed in the present application should be covered by the protected scope of the application. Thus, the patent protection scope of the present application should be subjected to what is claimed is.

What is claimed is:

1. A manufacturing method of a color filter substrate, comprising steps of:
   providing a first substrate, and the first substrate comprising pixel unit regions and a light blocking region located between the pixel unit regions, coating a photoresist material on the first substrate, and exposing the pixel unit regions to form monochromatic blocks, and partially exposing the light blocking region to form color blocks;

coating a black photoresist material in the light blocking region, and the black photoresist material covering the color blocks;

exposing the black photoresist material and the black photoresist material located in the light blocking region forming a black matrix and the black photoresist material covering the color blocks forming spacers.

2. The manufacturing method of the color filter substrate according to claim 1, wherein the color blocks formed by exposing the photoresist material process at one time comprise a first color block and a second color block, of which sizes are different.

3. The manufacturing method of the color filter substrate according to claim 2, wherein a size of a front projection of the first color block on the light blocking region is larger than a size of a front projection of the second color block on the light blocking region, and the black photoresist material on a surface of the first color block is exposed to form a main spacer, and the black photoresist material on a surface of the second color block is exposed to form an auxiliary spacer.

4. The manufacturing method of the color filter substrate according to claim 3, wherein the color blocks are located between adjacent two monochromatic blocks of the same color, and a color of the monochromatic block adjacent to the first color block is the same as a color of the monochromatic block adjacent to the second color block.

5. The manufacturing method of the color filter substrate according to claim 4, wherein a color of the first color block is the same as a color of the second color block.

6. The manufacturing method of the color filter substrate according to claim 5, wherein the color of the color blocks are the same as the color of the monochromatic blocks adjacent to the color blocks.

7. The manufacturing method of the color filter substrate according to claim 2, wherein the monochromatic blocks comprises red color blocks, green color blocks and blue color blocks, and the monochromatic blocks are located in the light blocking region between two of the blue color blocks which are adjacent.

8. The manufacturing method of the color filter substrate according to claim 7, wherein the color blocks are blue.

9. The manufacturing method of the color filter substrate according to claim 2, wherein the color blocks includes height dimensions perpendicular to the first substrate, and the height dimension of the first color block is equal to the height dimension of the second color block.

10. A manufacturing method of a liquid crystal panel, comprising steps of:

providing a first substrate, and the first substrate comprising pixel unit regions and a light blocking region located between the pixel unit regions, coating a photoresist material on the first substrate, and exposing the pixel unit regions to form monochromatic blocks, and partially exposing the light blocking region to form color blocks;

coating a black photoresist material in the light blocking region, and the black photoresist material covering the color blocks;

exposing the black photoresist material and the black photoresist material located in the light blocking region forming a black matrix and the black photoresist material covering the color blocks forming spacers;

dropping liquid crystal on the color filter substrate; and bonding a second substrate to the color filter substrate, and adhering an edge region of the second substrate with an edge region of the first substrate by using sealant.

11. The manufacturing method of a liquid crystal panel according to claim 10, wherein the color blocks formed by exposing the photoresist material process at one time comprise a first color block and a second color block, of which sizes are different.

12. The manufacturing method of a liquid crystal panel according to claim 11, wherein a size of a front projection of the first color block on the light blocking region is larger than a size of a front projection of the second color block on the light blocking region, and the black photoresist material on a surface of the first color block is exposed to form a main spacer, and the black photoresist material on a surface of the second color block is exposed to form an auxiliary spacer.

13. The manufacturing method of a liquid crystal panel according to claim 12, wherein the color blocks are located between adjacent two monochromatic blocks of the same color, and a color of the monochromatic block adjacent to the first color block is the same as a color of the monochromatic block adjacent to the second color block.

14. The manufacturing method of a liquid crystal panel according to claim 13, wherein a color of the first color block is the same as a color of the second color block.

15. The manufacturing method of a liquid crystal panel according to claim 14, wherein the color of the color blocks are the same as the color of the monochromatic blocks adjacent to the color blocks.

16. The manufacturing method of a liquid crystal panel according to claim 11, wherein the monochromatic blocks comprises red color blocks, green color blocks and blue color blocks, and the monochromatic blocks are located in the light blocking region between two of the blue color blocks which are adjacent.

17. The manufacturing method of a liquid crystal panel according to claim 16, wherein the color blocks are blue.

18. The manufacturing method of a liquid crystal panel according to claim 11, wherein the color blocks includes height dimensions perpendicular to the first substrate, and the height dimension of the first color block is equal to the height dimension of the second color block.

* * * * *